United States Patent
Hoshika (10) Patent No.: US 7,557,478 B2
(45) Date of Patent: Jul. 7, 2009

(54) STRUCTURE FOR A MOTOR/GENERATOR WITH AN IMPROVED STATOR AND METHOD OF MANUFACTURING SAME

(75) Inventor: Seiji Hoshika, Naka-gun (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 99 days.

(21) Appl. No.: 11/729,113

(22) Filed: Mar. 28, 2007

(65) Prior Publication Data

US 2007/0232094 A1 Oct. 4, 2007

(30) Foreign Application Priority Data

Mar. 30, 2006 (JP) ............................. 2006-093144

(51) Int. Cl.
*H02K 11/00* (2006.01)
(52) U.S. Cl. .......................................... 310/71; 310/180
(58) Field of Classification Search .................. 310/71, 310/179, 180, 214–218, 254–260
See application file for complete search history.

(56) References Cited

U.S. PATENT DOCUMENTS

| | | | |
|---|---|---|---|
| 5,828,147 A * | 10/1998 | Best et al. ..................... | 310/71 |
| 5,900,687 A * | 5/1999 | Kondo et al. ................... | 310/71 |
| 6,300,697 B1 * | 10/2001 | Findeisen et al. ......... | 310/68 B |
| 6,369,473 B1 * | 4/2002 | Baumeister et al. ........... | 310/71 |
| 6,470,984 B1 * | 10/2002 | Nakajima et al. .......... | 180/65.2 |
| 6,600,244 B2 * | 7/2003 | Okazaki et al. ................ | 310/71 |
| 6,914,356 B2 * | 7/2005 | Yamamura et al. ............ | 310/71 |
| 7,126,246 B2 * | 10/2006 | Izumi et al. .................. | 310/208 |
| 7,164,217 B2 * | 1/2007 | Kabasawa et al. ............. | 310/71 |
| 7,193,345 B2 * | 3/2007 | Shinzaki et al. ............... | 310/71 |
| 7,340,822 B2 * | 3/2008 | Yamamura et al. ............ | 29/598 |
| 2004/0070293 A1 * | 4/2004 | Kabasawa et al. ............. | 310/71 |
| 2006/0043806 A1 * | 3/2006 | Torii et al. ..................... | 310/71 |
| 2007/0046127 A1 * | 3/2007 | Kloeppel et al. ............ | 310/180 |

FOREIGN PATENT DOCUMENTS

| | | |
|---|---|---|
| JP | 11-299159 | 10/1999 |
| JP | 2001-320848 | 11/2001 |
| JP | 2003-333781 | 11/2003 |

* cited by examiner

*Primary Examiner*—Michael C Zarroli
(74) *Attorney, Agent, or Firm*—Young Basile (57) ABSTRACT

In a structure for a motor or generator, stator segments have a toothed portion to receive a coil. A busbar is electrically connected to the coil, and an insulator has a coil insulator portion disposed between the toothed portion and the coil and a busbar insulation portion insulatedly supporting the busbar.

17 Claims, 6 Drawing Sheets

AXIAL DIRECTION

INWARD DIRECTION

STRUCTURE FOR A MOTOR/GENERATOR WITH AN IMPROVED STATOR AND METHOD OF MANUFACTURING SAME

CROSS-REFERENCE TO RELATED APPLICATION

This application claims priority from Japanese Patent Application Serial No. 2006-093144, filed Mar. 30, 2006, which is incorporated herein in its entirety by reference.

FIELD OF THE INVENTION

The present invention relates in general to a structure for a motor or generator.

BACKGROUND

A motor or generator (motor/generator hereinafter) includes a plurality of coils for constituting an armature. Therefore, the motor/generator requires a busbar (a metal conductor for large current flow), which is used as a connection structure for flowing current by connecting the coils. While a sufficient area size and insulation performance are required for the busbar structure to energize the coils, physical compactness and low costs are desirable.

Japanese Patent Application Laid-Open No. 2003-333781 discloses a motor/generator configured such that divided cores on which coils are wound are arranged in a circumferential direction. Element lines are formed to project from the respective divided cores. Also, projected or salient portions of divided cores adjacent in the circumferential direction are connected by using metal fittings called "terminals."

SUMMARY OF THE INVENTION

Embodiments of a structure for a motor/generator are disclosed herein. According to one example, a structure for a motor or generator comprises a stator segment having a toothed portion to receive a coil, a busbar electrically connected to the coil and an insulator having a coil insulator portion disposed between the toothed portion and the coil and a busbar insulation portion insulatedly supporting the busbar.

Methods for assembling a structure for a motor or generator including a stator segment formed of metallic lamina are also taught herein. The stator segment includes an outer portion and a toothed portion projecting from the outer portion. One method taught herein comprises mounting an insulator on the stator segment, the insulator including a first portion surrounding the toothed segment and a second portion extending from the first portion and along a surface of the outer portion of the stator segment, and winding a coil on the toothed portion. The method also includes arranging a plurality of stator segments in a circumferential arrangement, each of the plurality including a respective insulator and wound coil. Finally, the method in this example includes press fitting a busbar between respective busbar insulating portions of the second portion of the insulator, wherein each of the respective busbar insulating portions includes at least one protrusion axially-extending from a surface of the second portion opposite to the outer portion of the stator segment.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

When manufacturing the motor/generator described in Japanese Patent Application Laid-Open No. 2003-333781, processes have to be done such that input line busbars of a conventionally general type are separately assembled and are mounted into a motor/generator casing, which is a structure separate from the busbars. Thus, the separate motor/generator casing has to be provided, resulting in cost increase.

Figure 1:
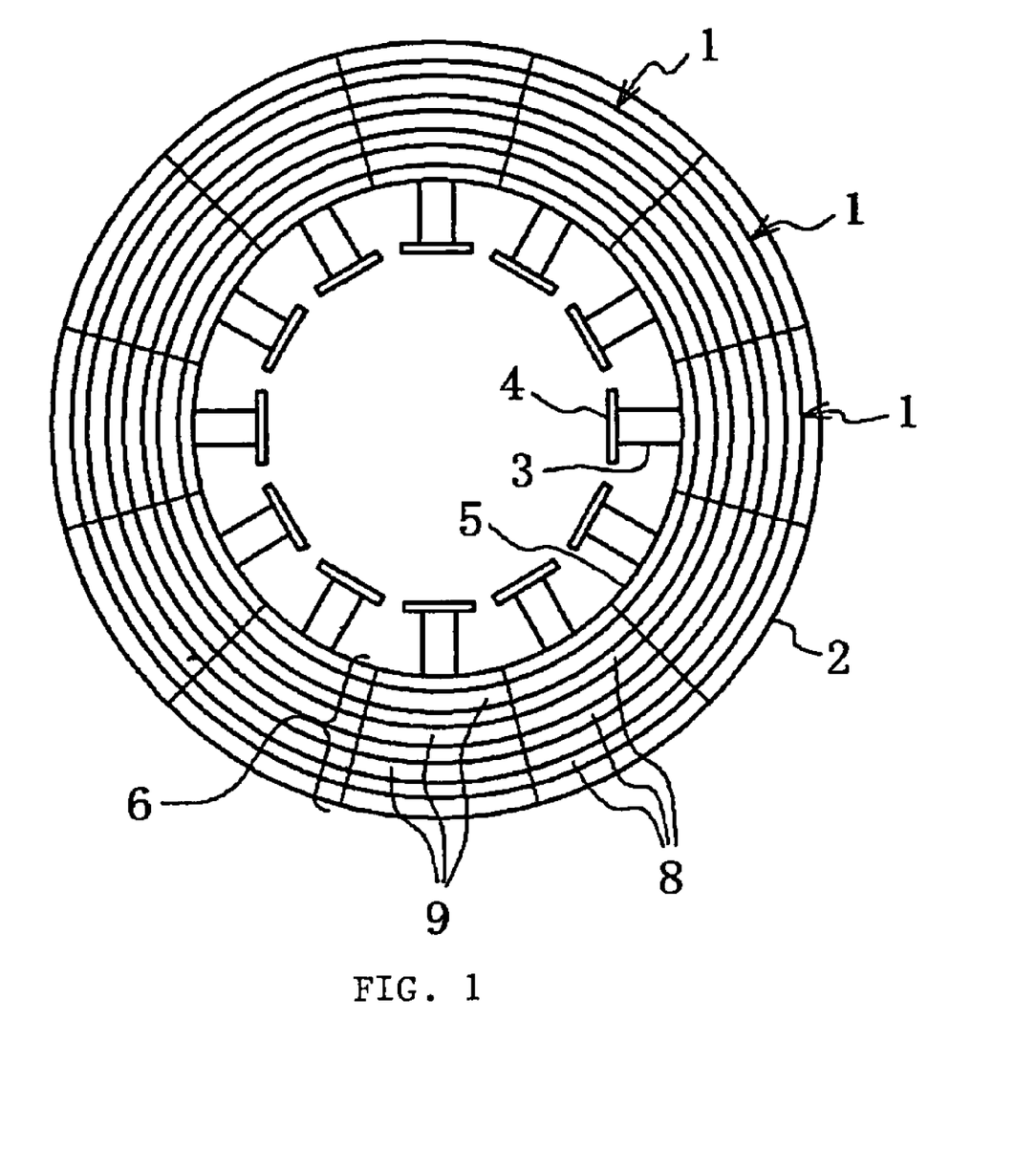
FIG. 1 is a front view of a busbar insulation structure common to embodiments of the invention, as viewed from an axial direction.

In contrast, the busbar insulation structure taught herein is easily mountable and is capable of contributing to cost reductions in manufacture. Shown in FIG. 1 is an example of a motor/generator including twelve (or twelve sets of) teeth 0A (see FIG. 2B) provided in a stator 2. A busbar insulation structure of the embodiment includes twelve insulation segments 1 divisionally provided in the circumferential direction.

Figures 2A, 2B:
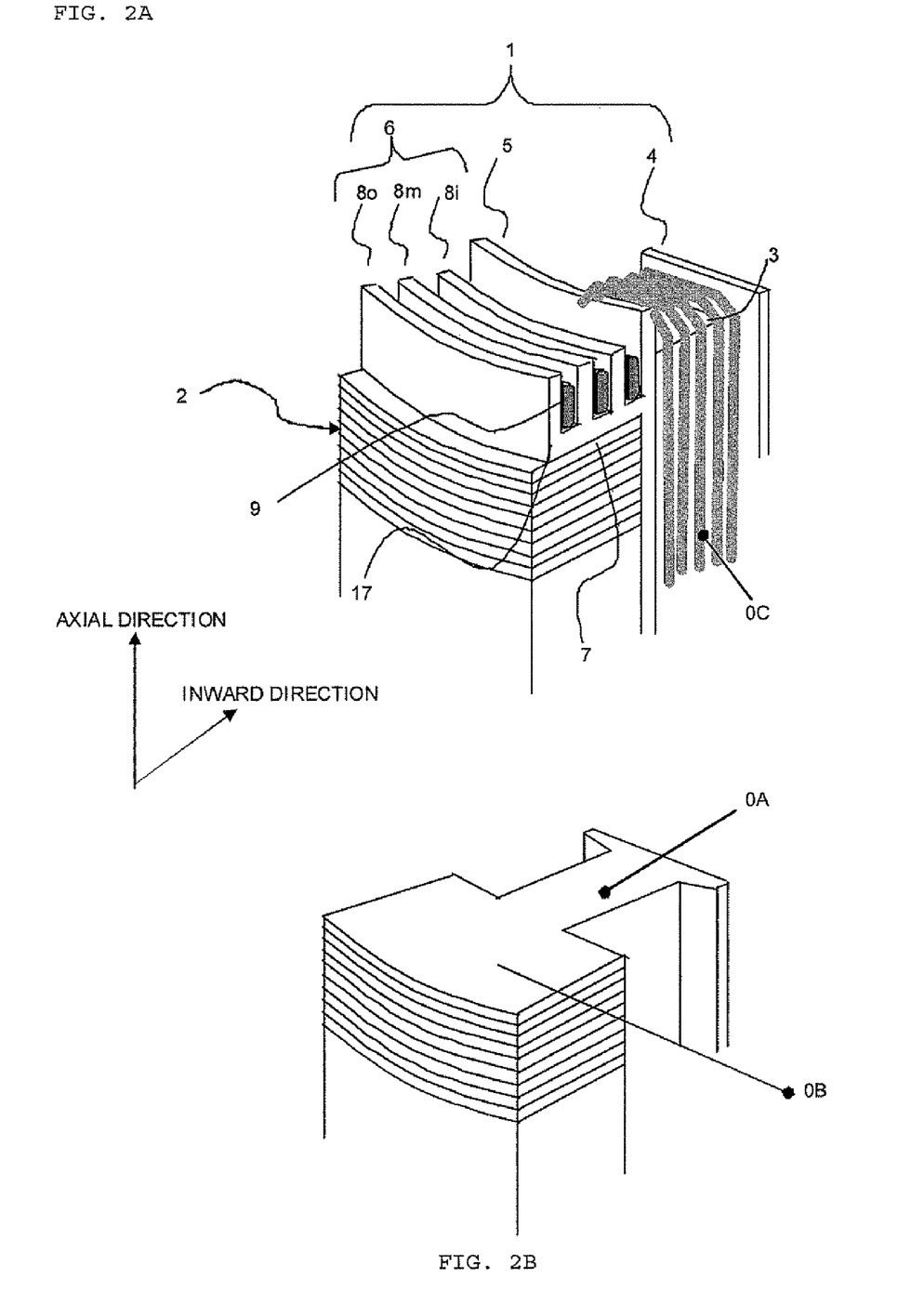
FIG. 2A is an enlarged perspective view of an axial end portion of one of the insulation segments in accordance with a first embodiment.
FIG. 2B is an enlarged perspective view in the same axial direction of the insulation segment shown in FIG. 2A illustrating certain features.

FIGS. 2A and 2B are enlarged perspective views of an axial end portion of one of the insulation segments 1. The stator 2 is formed by laminating metallic sheets in the axial direction, and the stator 2 is configured to include the insulation segments 1. Each of the insulation segments 1 is formed from an arcuate outer (or yoke) portion 0B and teeth 0A projecting from the outer portion 0B. That is, as shown in FIGS. 1 and 2A and 2B, the stator 2 is assembled from the respectively separated insulation segments 1. Although not shown, the forming manner can be such that annuluses extending along the circumferential direction are laminated into a hollow cylindrical unit, and respective insulation segments are fitted to the hollow cylindrical unit.

The teeth 0A are provided on the inner periphery side of the stator 2, in which the teeth 0A are oriented along the inward direction. The entire circumferential side of the teeth 0A is surrounded by the resin-made insulation segments 1. The portion 3 surrounded in units of one set of the teeth 0A is referred to as an "insulator portion" 3.

Wall-shaped insulator portions 4 are each provided to an inside diameter end of the insulator portion 3 to extend perpendicular (i.e., at a right angle) to the radial direction. Similarly, wall-shaped insulator portions 5 are each provided to an outside diameter end of the insulator portion 3 to extend perpendicular to the radial direction. The insulator portions 4 and 5 are provided around the teeth 0A.

A coil 0C is wound about a section formed from the insulator portions 3, 4 and 5. Thereby, the coil 0C is wound around the entire circumferential side of the stator 2 to completely electrically insulate the three sides 3, 4 and 5 from the teeth 0A.

On the insulation segment 1, a portion on the outside diameter side adjacent the insulator portion 5 is referred to as a "busbar insulation portion" 6. In the case of a three-phase AC motor/generator, the busbar insulation portion 6 insulatedly supports the busbars consisting of three lines or four lines inclusive of a neutral line by connecting the coils together. The phrase "insulatedly supports" can further mean that the busbar insulation portion 6 is integrally formed in the stator 2 with the same material as the insulator portion 5. The busbar insulation portion 6 includes a fan-shaped portion 7 covering an end portion of the stator 2 in the axial direction and three wall-shaped ribs 8 (8i, 8m, and 8o) projectively provided from the fan-shaped portion 7. The three wall-shaped ribs 8 are provided to arcuately extend from the fan-shaped portion 7 and are concentrically disposed.

One busbar 9 constituting the busbar insulation structure is inserted between one of the three wall-shaped ribs 8, namely rib 8i, on the inside diameter side and the insulator portion 5 closer to the inside diameter side than the rib 8i. Another busbar 9 is inserted between the rib 8i on the inside diameter side and the rib 8m closer to the outside diameter side than the rib 8i. Another busbar 9 is inserted between the rib 8m and the rib 8o closer to the outside diameter side than the rib 8m.

The resin-made ribs 8 are slightly elastically deformable, and one busbar 9 is held between two adjacent ribs 8. As shown in FIG. 1, the three busbars 9 shown in FIG. 2 are each formed into an annular shape.

In the assembly of the motor/generator, when the insulation segments 1 are mounted in the stator 2 and the arrangement thereof in the circumferential direction is completed, respective busbars 9 are inserted between the adjacent ribs 8.

Alternatively, the assembly method can be such that the arcuate busbars 9 are separated or split into the same length as the rib 8 in the circumferential direction and are preliminarily inserted into the insulation segments 1. Then the insulation segments 1 are arranged in the circumferential direction. The arcuate busbars 9 are connected to one another after arrangement of the insulation segments 1.

Returning to the description in conjunction with FIG. 2A as described above, the fan-shaped portion 7 of the busbar insulation portion 6 insulates the busbar 9 from the stator 2. The ribs 8i, 8m, 8o of the busbar insulation portion 6 insulate the respective adjacent busbars 9 from one another. The insulator portion 5 insulates the busbar 9 from the coil 0C. The rib 8o on the outside diameter side insulates the busbar 9 on the outside diameter side from external conditions.

Figure 3:
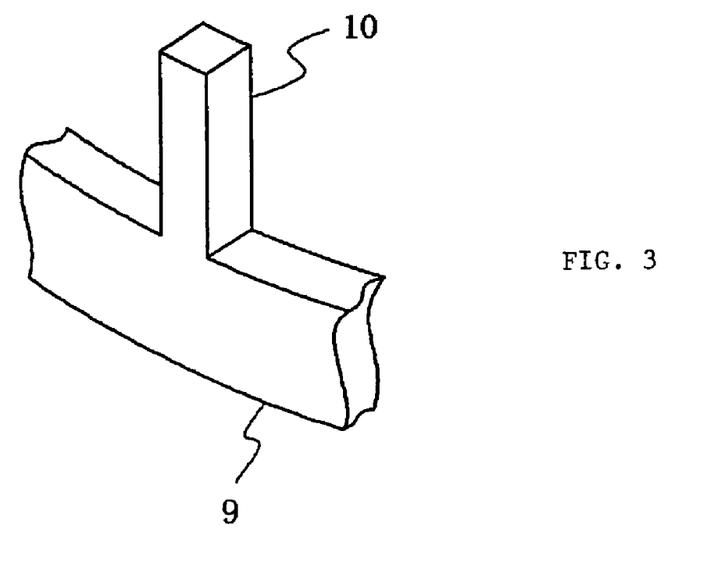
FIG. 3 is a perspective view of a connection terminal of a busbar.
Figure 4:
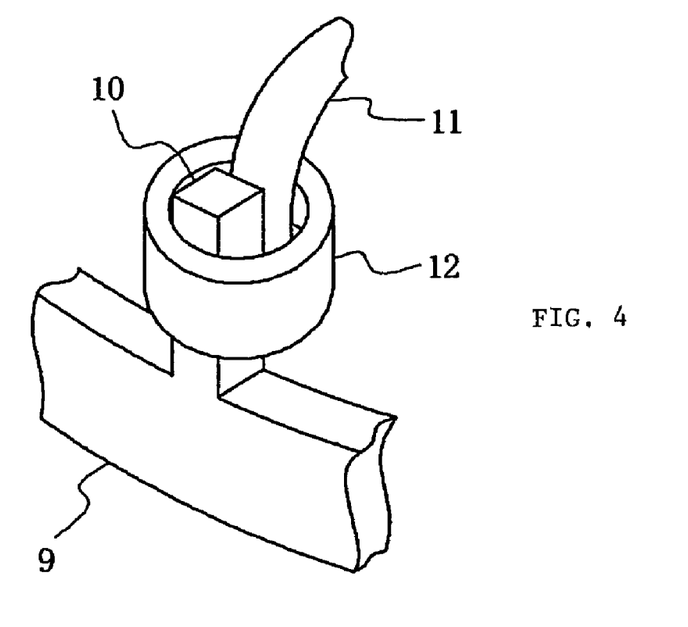
FIG. 4 is a perspective view of a coil end portion connected to the connection terminal of the busbar.

The busbars 9 are connected to the coil 0C along the inward direction. A connection portion therebetween is shown in FIGS. 3 and 4. As shown in FIG. 3, one or two connection terminals 10 are projectively provided from the busbar 9 according to units of the coil 0C. Desirably, a tip end of the connection terminal 10 is located in a relatively shallow position in a groove formed between the adjacent ribs 8 in which the busbar 9 is disposed.

As shown in FIGS. 2A and 4, when the coil 0C is wound on the entire circumferential side of the insulator portion 3, 4, 5, an end portion 11 of the coil 0C is passed over the wall-shaped insulator portion 5 to extend up to the tip end of the connection terminal 10.

The end portion 11 and the connection terminal 10 are electrically connected with, for example, a hollow-cylindrical member such as annular sleeve 12 so that the end portion 11 and the connection terminal 10 are electrically connected together. The sleeve 12 can be located in the groove formed between the adjacent ribs 8 in which the busbar 9 is disposed.

Figure 5:
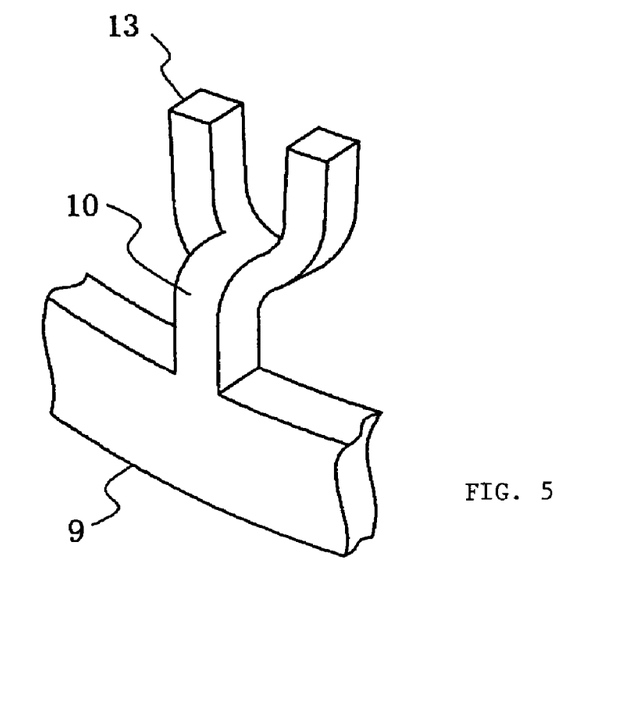
FIG. 5 is a perspective view of a second example of the connection terminal of the busbar.

Alternatively, regarding the structure of the connection between the busbar 9 and the coil 0C, in addition to the structures shown in FIGS. 3 and 4 the structure can be such as shown in FIG. 5. Therein, the tip end of the connection terminal 10 is formed into a U shape. The coil end portion 11 is located in the U-shaped portion 13, and two ends of the U-shaped portion 13 are electrically connected to thereby electrically connect between the coil end portion 11 and the connection terminal 10.

In this case, the caulking described above can be performed to locate the connection portion between the coil end portion 11 and the connection terminal 10 in the groove formed between the adjacent ribs 8 in which the busbar 9 is disposed.

Figure 6:
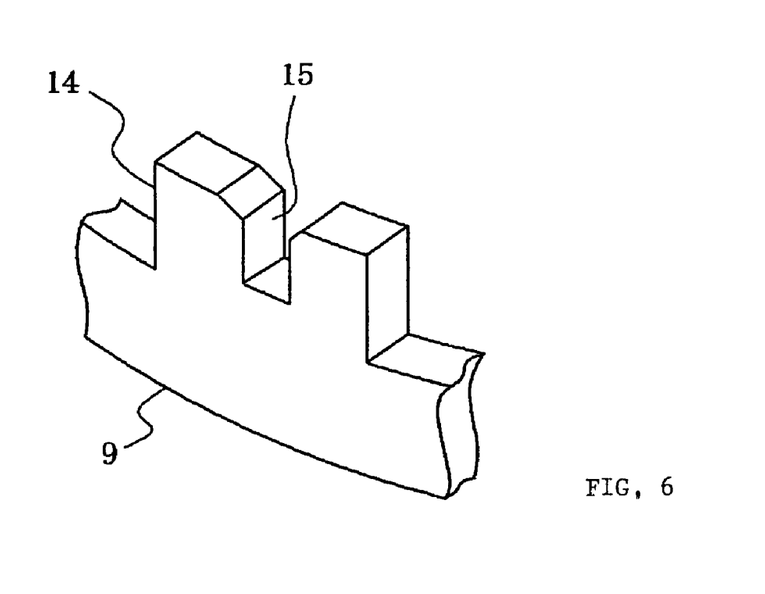
FIG. 6 is a perspective view of a third example of the connection terminal of the busbar.

Still alternatively to the structures shown in FIGS. 3 to 5, the structure can be such as shown in FIG. 6. In this case, in place of the connection terminal 10, an angular U-shaped connection terminal 14 is integrally formed with the busbar 9. A notched recess portion 15 is preliminarily oriented in the opposite direction to the busbar 9. In this case, the tip end of the connection terminal 14 is located in a relatively shallow portion in the groove formed between the adjacent ribs 8 in the groove in which the busbar 9 is disposed. The coil end portion 11 is press fit into the recess portion 15 to thereby electrically connect the coil end portion 11 and the connection terminal 14.

In the example shown in FIGS. 1 and 2A, the respective busbar insulation portions 6 for insulatedly supporting the busbars 9 are integrally provided to the insulator portions 3, 4 and 5 provided on the entire circumferential side of the teeth 0A. As a consequence, the insulator portions 3, 4 and 5 and the busbar insulation portion 6 can be manufactured in a single injection molding process, consequently making it possible to improve the work efficiency.

Further, since the busbar placement can be carried out by inserting the busbar 9 between the ribs 8 provided in the busbar insulation portion 6, the assembly work is facilitated. Consequently, costs in manufacturing motor/generators can be reduced.

A busbar insulation structure for a motor/generator of a second embodiment is next discussed.

Figure 7:
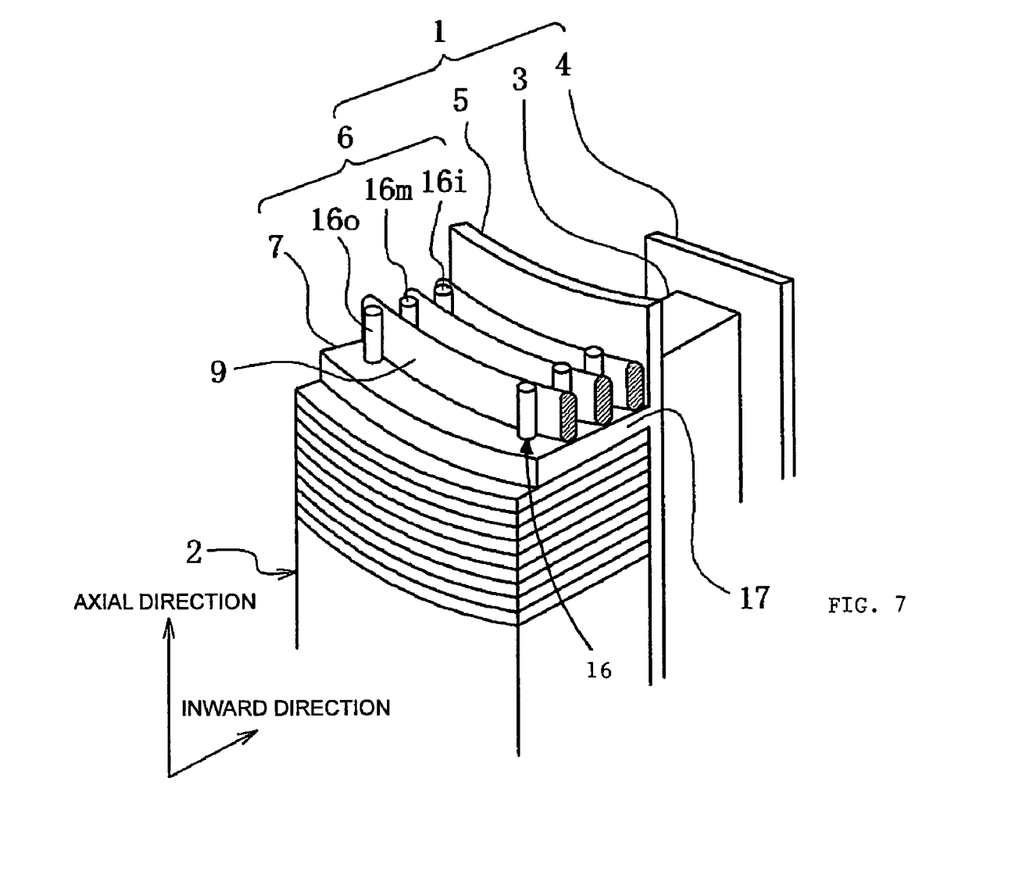
FIG. 7 is an enlarged perspective view of an axial end portion of one of the insulation segments in accordance with a second embodiment of the invention.

FIG. 7 is an enlarged perspective view of an axial end portion of one of the insulation segments of the busbar insulation structure. In the second embodiment protrusions are provided in place of the ribs 8 shown in FIGS. 1 and 2.

In FIG. 7, components common to those in the first embodiment described above are shown with the same reference numerals, and descriptions thereof are omitted herefrom. However, components different from those in the first embodiment are shown with different reference numerals and are described.

In the second example, six protrusions 16 (16i, 16m, and 16o) are provided from the fan-shaped portion 7 that covers the axial end portion of the stator 2 in the busbar insulation portion 6. The six protrusions 16 are provided in two circumferential end portions of the fan-shaped portion 7. More specifically, one series of three protrusions 16 are provided in one end portion of the fan-shaped portion 7, and the other series of three protrusions 16 are provided in the other end portion of the fan-shaped portion 7. The respective series of three protrusion 16 are disposed serially from the protrusions 16$i$ to 16$o$ along the outward direction from the side of the insulator portion 5.

As shown in FIG. 7, three busbars 9, which coaxially extend in such a manner as to form a circular arc, are respectively inserted among clearances between three protrusions 16 and insulator portion 5 arranged in the radial direction. The busbars 9 are spaced apart from one another at a distance or width of the protrusion 16, whereby the busbars 9 are insulated such that the busbars 9 do not short circuit with one another.

Although not shown in FIG. 7, the connection terminal 10 and the like (see FIGS. 3 to 6) for connection with the coil 0C are provided to respective busbars 9 for respective units of one insulation segment 1.

In the second embodiment, as similarly shown in FIG. 2A and as in the first embodiment described above, the insulator portions 3, 4 and 5 and the busbar insulation portion 6 can be manufactured by a single injection molding process, consequently making it possible to improve the work efficiency.

Further, since the busbar disposition can be carried out by inserting the busbar(s) 9 between the protrusions 16 provided in the busbar insulation portion 6, the assembly work is facilitated. Consequently, there is a cost savings in the manufacture of the motor/generators.

Either the ribs 8 in the first embodiment (FIGS. 1 and 2A, 2B) or the protrusions 16 in the second embodiment support the busbar 9 interposed therebetween. However, a concern can arise in that the respective busbar 9 can move apart from the busbar insulation portion 6 and be disconnected from the ribs 8 and protrusions 16.

Figure 8:
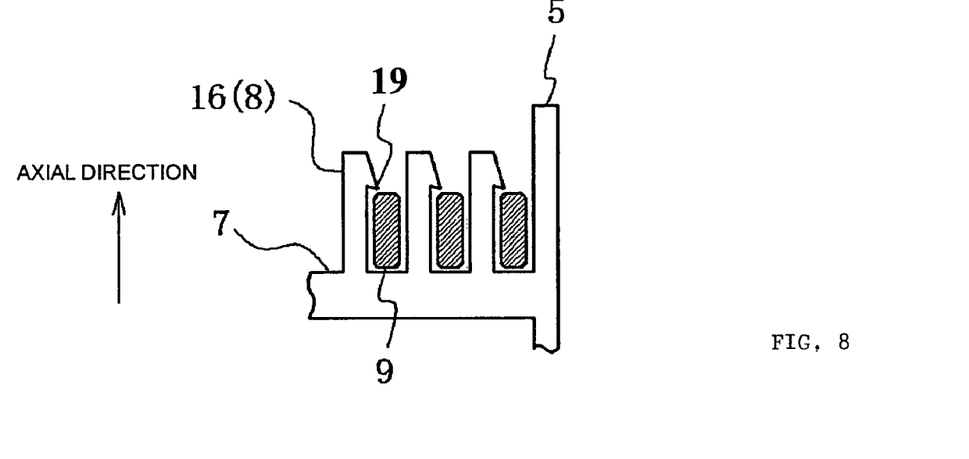
FIG. 8 is a side view of a busbar removal prevention device accorded to the first and second embodiment, as viewed from the circumferential direction.

As such, as shown in FIG. 8, a hook 19 can be provided as a removal prevention device for the tip end of the respective rib 8 or protrusion 16. The hook 19 is formed to have a shape smooth towards the tip end of the rib 8 or protrusion 16 and to have a hook shape protruding towards a base of the rib 8 or protrusion 16. This facilitates insertion of the busbar 9 between the protrusions 16 (or ribs 8) from the axially external direction, and concurrently makes the inserted busbar 9 less easily removable along the axially external direction.

Figure 9:
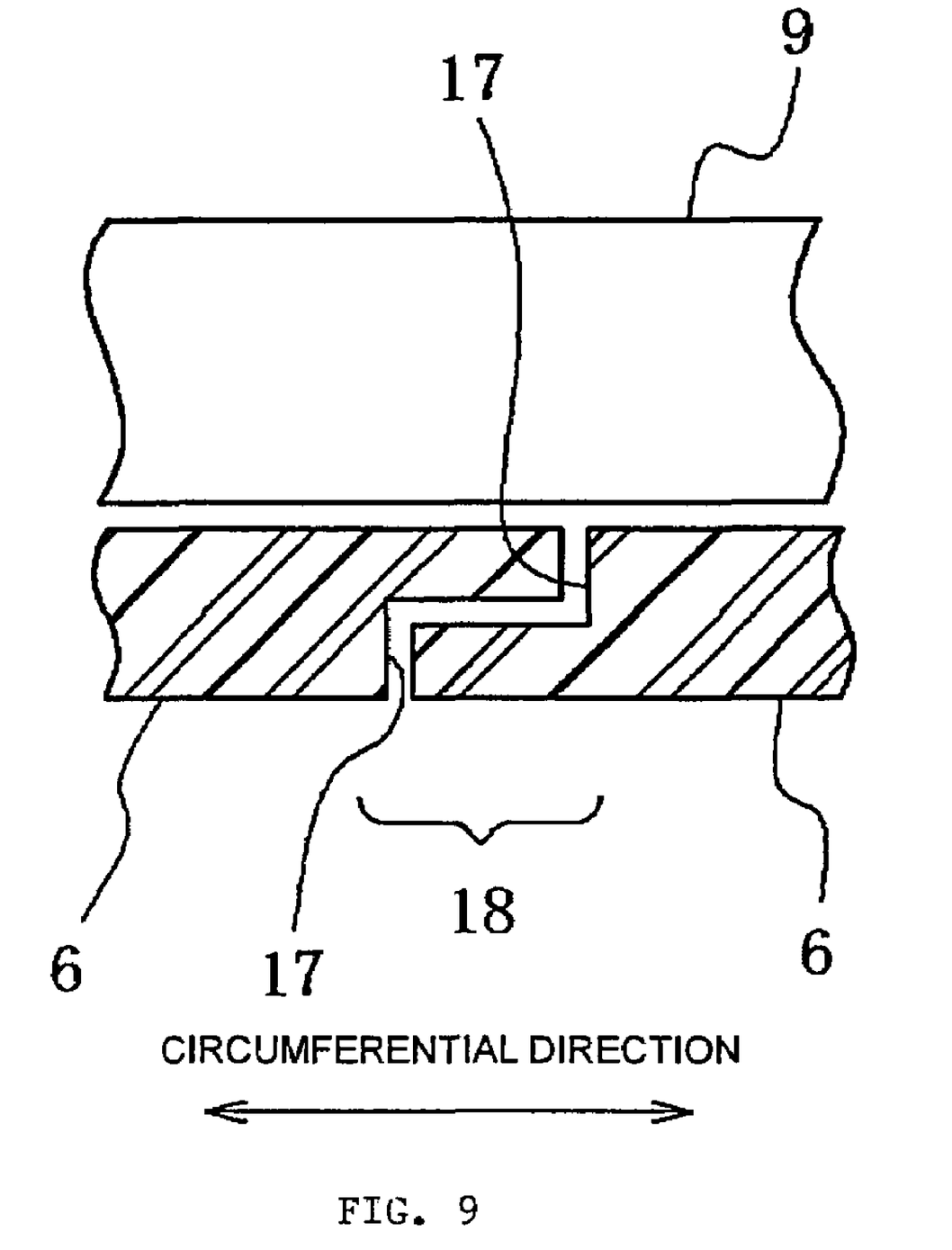
FIG. 9 is a schematic view of circumferential ends of busbar insulation portions connected together between adjacent insulation segments.

As shown in FIG. 1, in the first and second embodiments, when the insulation segments 1 are arranged in the circumferential direction, the adjacent insulation segments 1 in the circumferential direction are connected to one another. This contributes to an improvement of reliability of a busbar insulation structure. As such, in the first embodiment, it is desirable that adjacent circumferential ends 17 (see FIGS. 2A, 7) of the busbar insulation portion 6 are each formed to project so as to be engageable with one another. More specifically, as shown in FIG. 9 step-shaped projected portions 18 are provided whereby the adjacent circumferential ends 17 are coupled or connected in such a manner as to overlap with one another. Similarly, in the second embodiment shown in FIG. 7 the step-shaped projected portions 18 (shown in FIG. 9) are provided respectively to the insulator portion 5 and the circumferential ends 17 of the fan-shaped portion 7.

In the connected state shown in FIG. 9, the busbar insulation portions 6 of the adjacent insulation segments 1 are rendered less disengageable from one another. Thereby, even when external forces causing relative movements are exerted on the adjacent busbar insulation portions 6, a sufficient insulation performance of the busbar 9 can be secured in resistance to an offset between the busbar insulation portions 6.

According to the first and second embodiments described above, the busbar insulation portion 6 insulatedly supporting the respective three busbars 9 is provided to the insulator portions 3, 4 and 5. Therefore, the insulator portions 3, 4 and 5 interposed between the respective teeth 0A and coil 0C have insulation properties. As such, respective busbars 9 can be insulated from one another by the same materials as the insulator portions 3, 4 and 5.

Further, the insulation segment 1 integrally formed with the insulator portions 3, 4 and 5 supports not only the coils 0C but also the busbars 9. Consequently, the structure is capable of contributing to implementation of the physical compactness of the busbar insulation portion 6 having the insulation properties. The structure also provides labor saving features for the busbar assembly work.

Since the insulation segment 1 can be manufactured by a single injection molding process, the work for manufacturing the insulator portions 3, 4 and 5 and the busbar insulation portion 6 and the work for connecting them can be concurrently carried out. This makes it possible to improve the work efficiency.

Further, the busbar disposition can be carried out by insertion of the busbar 9 between the adjacent ribs 8 provided in the busbar insulation portion 6. Thereby, sealant injection work conventionally carried out is obviated, thereby making it possible to simplify the work for insulation. More specifically, the busbar insulation portions 6 are constituted by the ribs 8 (as shown in FIG. 2A) or the protrusions 16 (as shown in FIG. 7) and are interposed between the adjacent busbars 9 to thereby space the busbars 9 from one another.

As shown in FIG. 8, in the respective embodiments described above, the busbar removal prevention device is provided to the tip end of the protrusion 16 or rib 8 by the provision of, for example, hook 19. Hook 19 prevents removal of the busbar 9 from the adjacent protrusions 16 or ribs 8. As a consequence, the busbar insulation portion 6 is able to securely support the busbars 9.

As shown in FIG. 1, in the respective embodiments described above, respective sets of the insulator portions 3, 4 and 5 are formed corresponding to the teeth 0A to form the insulation segments 1. The sets of the insulator portions 3, 4 and 5 are arranged along the circumferential direction. Thereby, the adjacent busbar insulation portions 6 are connected to one another.

Therefore, a metal mold or die for injection molding of the insulation structure can be reduced in size to the segment unit, and it is possible to reduce the amount of mold costs. Further, the removal prevention device minimizes disconnection of the busbar insulation portions 6 from one another. Thereby, even when a slight relative movement occurs between the adjacent busbar insulation portions 6, insulation of the respective busbars 9 can be secured.

More specifically, as shown in FIG. 9, in the adjacent busbar insulation portions 6 the circumferential ends 17 to be connected are formed to project along the circumferential direction to provide the projected portions 18. The projected portions 18 are connected so as to overlap with one another. Consequently, the respective busbars 9 can be securely insulated.

Also, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A structure for a motor or generator, comprising:
a stator segment having a tooth portion to receive a coil and a yoke portion extending radially away from the tooth portion;
a busbar electrically connected to the coil; and
an insulator having a coil insulator portion disposed between the tooth portion and the coil and a busbar insulation portion insulatedly supporting the busbar and integrally formed with an axially-extending insulator portion insulating the busbar from the coil, the busbar insulation portion mounted in contact with a radially-extending surface of the yoke portion.

2. The structure according to claim 1 wherein the busbar insulation portion includes a first protrusion disposed adjacent the busbar to space the busbar apart from another busbar.

3. The structure according to claim 2 wherein the first protrusion includes a second protrusion that prevents the busbar from being removed from the busbar insulator portion.

4. The structure according to claim 3, wherein the second protrusion is a hook at the end of the first protrusion.

5. The structure according to claim 1 wherein:
the stator segment is one of a plurality of stator segments arranged circumferentially into a stator, each of the stator segments including a respective tooth portion to receive a respective coil and a respective yoke portion extending radially away from the respective tooth portion;
the insulator is formed in units, each of the units corresponding to one of the plurality of stator segments and each of the units including a respective busbar insulation portion insulatedly supporting a respective busbar and integrally formed with a respective axially-extending insulator portion insulating the respective busbar from a coil associated with the one of the plurality of stator segments and the busbar insulation portion mounted in contact with a radially-extending surface of a yoke portion associated with the one of the plurality of stator segments; and
each busbar insulation portion is connected to an adjacent busbar insulation portion.

6. The structure according to claim 1 wherein the busbar insulation portion is composed of a same material as the insulator.

7. The structure according to claim 2 wherein the first protrusion is an annular rib.

8. The structure according to claim 7 wherein the first protrusion includes a second protrusion that prevents the busbar from being removed from the insulation portion.

9. The structure according to claim 8 wherein the second protrusion is a hook formed at a distal end of the rib.

10. The structure according to claim 2, further comprising:
connection terminals projecting from the busbar.

11. The structure according to claim 10 wherein an end portion of the coil is electrically connected with at least one of the connection terminals.

12. The structure according to claim 10 wherein the end of one of the connection terminals bifurcates into two branches forming a U-shaped portion, and an end portion of the coil is electrically connected to the U-shaped portion.

13. The structure according to claim 11 wherein a tip portion of the at least one of the connection terminals has a notched recess portion, an end portion of the coil press fit into the recess portion.

14. The structure according to claim 1 wherein the insulator further comprises:
a wall-shaped insulating end portion located on an end of the tooth portion opposite the axially-extending insulator portion insulating the busbar from the coil.

15. The structure according to claim 14 wherein the wall-shaped insulating end portion extends axially and tangentially from the end of the tooth portion to support the coil on the tooth portion.

16. The structure according to claim 5 wherein each unit of the insulator further comprises:
a wall-shaped insulating end portion located on an end of tooth portion associated with the one of the plurality of stator segment opposite the respective axially-extending insulator portion insulating the respective busbar from the coil associated with the one of the plurality of stator segments.

17. A structure for a motor or generator, comprising:
a stator segment having a toothed portion to receive a coil;
a busbar electrically connected to the coil; and
an insulator having a coil insulator portion disposed between the toothed portion and the coil and a fan-shaped busbar insulation portion insulatedly supporting the busbar and integrally formed with an insulator portion insulating the busbar from the coil;
wherein adjacent busbar insulation portions each have circumferential ends for connection therebetween, respective circumferential ends opposing one another and providing projected portions along the circumferential direction to overlap with one another when connected.

* * * * *